United States Patent [19]
Tornabene

[11] 4,073,142
[45] Feb. 14, 1978

[54] WAVE-ACTION POWER APPARATUS

[76] Inventor: Michael G. Tornabene, 462-7th Ave., New York, N.Y. 10018

[21] Appl. No.: 578,178

[22] Filed: May 16, 1975

Related U.S. Application Data

[63] Continuation-in-part of Ser. No. 507,127, April 11, 1975, abandoned, and a continuation-in-part of Ser. No. 566,984, April 10, 1975, and a continuation-in-part of Ser. No. 566,983, April 10, 1975, and a continuation-in-part of Ser. No. 566,985, April 10, 1975, and a continuation-in-part of Ser. No. 432,211, Jan. 10, 1974, abandoned, and a continuation-in-part of Ser. No. 428,349, Dec. 26, 1973, abandoned.

[51] Int. Cl.² ............................................. F03G 7/10
[52] U.S. Cl. ...................................... 60/502; 60/505
[58] Field of Search .................................. 60/497–507; 417/332; 290/53, 54

[56] References Cited

U.S. PATENT DOCUMENTS

| 250,104 | 11/1881 | Roberts | 60/507 X |
|---|---|---|---|
| 2,783,022 | 2/1967 | Salzer | 60/505 |

FOREIGN PATENT DOCUMENTS

| 250,209 | 11/1926 | United Kingdom | 60/507 |

Primary Examiner—Allen M. Ostrager

[57] ABSTRACT

In a preferred embodiment of the invention, a series of off-set rows of spaced-apart upwardly and downwardly reciprocatable floats are mountedly positioned with predetermined distances and positions relative to one-another such that radially-outwardly traveling turbulances resulting from upward and downward reciprocation of the floats coincide with one-another and with current and/or wave water forces to result in amplified strokes of reciprocation of the floats, and the process of subjecting the floats to such forces, and pooling the energy of a plurality of such floats into a common driving force.

9 Claims, 5 Drawing Figures

WAVE-ACTION POWER APPARATUS

This invention relates to a process and mechanism of harnessing wave energy, and this is a continuation-in-part of the parent applications:

(1) A WAVE-ACTION POWER CONVERSION APPARATUS filed on Dec. 26, 1973, filed as Ser. No. 428,349 now abandoned;
(2) WAVE-ACTION POWER CONVERSION APPARATUS filed Jan. 10, 1974, filed as Ser. No. 432,211 now abandoned;
(3) A GEAR DEVICE AND WAVE-ACTION COMBINATION filed Apr. 10, 1975, filed as Ser. No. 566,985;
(4) A WAVE-ACTION POWER CONVERSION APPARATUS filed Apr. 10, 1975, filed as Ser. No. 566,983;
(5) IMPROVED WAVE-ACTION POWER CONVERSION APPARATUS filed Apr. 10, 1975, filed as Ser. No. 566,984; and
(6) PROCESS AND DEVICE FOR HARNESSING WAVE ENERGY filed Apr. 11, 1975, filed as Ser. No. 507,127 now abandoned; each and all of the above-noted parent applications above-identified being hereby now incorporated by reference in their entireties hereinto this disclosure as an intimate and functional part of the present invention.

Prior to the present invention, it would have been substantially unthinkable to suggest that a float's upward actual stroke could exceed the calculated expected stroke calculated as based on known energy of a particular wave.

SUMMARY OF THE INVENTION

Objects of the present invention are to obtain greater range in upward and downward strokes of floats responsive to waves and currents to which the floats are normally subjected.

Another object is to obtain a novel combination for effecting the preceding object.

Another object is to obtain a process of consecutive steps of directing water forces against particularly arranged floats and of pooling harnessed torques from a plurality of such floats.

Another object is to induce artificial water forces from currents to interact with other water forces to obtain amplified upward and/or downward strokes of an upwardly and downwardly reciprocating float(s) responsive to normal water wave and current forces.

Another object is to obtain a novel float shape effective in optimum operation consistent with other objects of this invention.

Other objects become apparent from the preceding and following disclosure.

One or more of preceding objects are obtained by the invention as defined herein.

Broadly the invention may be defined as positioning a plurality of separate floats in predetermined spaced-distance and position relationships relative to one-another and relative to surrounding natural waves and water currents and subjecting the same to these forces such that upward and downward reciprocating motion of the plurality result in radially outwardly traveling turbulance water pressures or forces which interact with one-another in phase, and with normal forces of waves, and/or current(s) and/or turbulances, in phase, such turbulence(s) forces (whether the various turbulence is natural and/or artificially induced), particularly at points of intersection at the floats themselves and/or where intersections have resulted in additional turbulence which eventually reach(es) the float(s), resulting in increased intermittent water pressures on the float(s) thereby effecting lengthened strokes of reciprocation of the float(s) upwardly and downwardly and of the lever elements associated with the respective float(s). Preferably the resulting torques of a plurality of such floats are pooled commonly by interconnecting lever mechanisms as illustrated diagrammatically, by any suitable or desirable and/or conventional mechanism(s). As set forth in the parent application Ser. No. 507,127 filed Apr. 11, 1975, wind waves and/or upper-layer water movements as well as deeper water movements such as currents of various types and/or of ground-swell variety, or the like, each and all are contemplated as additional one or more forces and/or turbulence(s) of the water that may be directed to interact with the water turbulence forces (whatever one might call them) resulting from the reciprocating undulations upwardly and downwardly of the respective floats of the plurality, with a resulting efficiency highly increased in the degree of total energy output for one and/or more of the plurality of floats both on an individual basis as well as cumulatively speaking. The general contemplated mechanism of operation of the water forces resulting from the upward and downward floats reciprocation is more or less set forth on the page 3 last paragraph of the parent application Ser. No. 507,127; however, Applicant is not to be considered to be bound by such theory. In the illustrations, although pluralities of floats have a common energy-assimulation structure identified as such, the different energy-assimulation structures for different pluralities may or may not, as desired, be commonly tied-in to one-another as might be desired, by any desired and/or conventional mechanism(s), and the energy-assimulation structures may be located on platforms above and/or within the water and/or on land. Such energy-assimulation structures (as herein referred to) may be and/or include electrical generators or any other desired and/or conventional mechanism for the conversion and/or storage and/or transmission and/or utilization of energy and/or torques harnessed from the water forces by virtue of the invention as described above and hereafter.

In greater particularity as to a mechanism of or theory of operation of the present invention, which appears to be substantiated at least to some degree by a novelly designed float structure, the wave rings of turbulence caused by the upward and downward reciprocations result particularly from a lagging behind of the float in its upward movement subsequent to the initial rising of the upper water surface of a developing wave moving toward its crest. More particularly, two factors appear to be involved here, at least. First of all, the large predetermined mass of the float and any additional weight(s) and of the mounting shaft of the float, serve to cause the downward stroke to surge deeply beneath the surface of the water at the valley of the wave at the end portion of the downward stroke, with the result that as the float eventually reaches the lower end of its stroke and reverses to initiate an upward stroke, the distance of travel upwardly to bring about theoretically a return to equilibrium with surface level water results in a rapid upward surge of the float with the float causing turbulence as it rushes or pops upwardly; however, this upward rushing of the float is further accentuated by virtue of the above-noted lag of the float, since during the deep stroke the next-occurring wave has begun with its rising water level upper surface, such that the depth of the float below the water surface at the beginning of the upward stroke is even further increased, resulting in an even greater turbulence as the float surges upwardly through the upper water surface to thereafter follow upwardly the wave. Secondly, it appears that a preferred shape of an upper surface of the float is hemispherical or conical such that the upper surface cuts effectively through water covering inwardly upper surfaces of the float, but more importantly to provide for ready inward radial movement of water above upper float structure such that as the float surges upwardly the covering water is thrown-away, preferably neatly split by the hemispherical or conical upper float structure to throw the covering water radially outwardly by virtue of the angularly upwardly radially inwardly extending float upper surface of the conical or hemispherical structure as the floats upper half. Thereby the magnitude of the radially outwardly-moving wave rings is significantly increased. Additionally, however, this preferred float has also preferably a cone-shaped base which is effective in piercing downwardly into the water during the surging downward stroke thus facilitating the lengthening of the downward stroke and concurrently thereby providing for a greater turbulence on the next-occuring upper stroke. Further, the conically recessed lower float structure enhances the extent to which water surges radially inwardly beneath the float at the top of the stroke as the float also lags in its initiating of the downward stroke for a short time interval as the wave has already begun and continued to recede toward the valley state of the wave; this inward rushing of the water beneath the float in and of itself results in turbulence, but the pressing radially outwardly of this water from beneath the float as the float moves toward theoretical equilibrium further accentuates the magnitude of radially outwardly moving wave ring(s) and like turbulence(s). Finally, another desired feature of the present invention, at least in a preferred embodiment thereof, is that, relative to the size and mass (total) of the float and other associated weights and/or elements thereof, the shaft is of a material or composition and dimension(s) in cross-section thereof, such that as buoyancy action on the float during the upward stroke is sufficiently to flex the shaft to at least some minor but significant degree, with the result that the distal end of the float where the float is mounted tends to undulate to and fro laterally within the water thereby causing turbulence such as the wave rings moving radially outwardly from the float.

With reference to the off-set positioning of the floats such as typically in consecutive and/or staggered rows of floats, it should be noted that the staggered relationship is critically relative to the direction from which the waves are coming, and if it be assumed that wave direction varies from time to time, the positioning of the floats (plurality of floats) in off-set arrangement from one-another is relative — in angle, to the most usual and/or normal direction from which the waves come. It is however conceivable that a support on which the plurality of floats are supported may be variable in position intermittently such that the platform, for example, might be rotated to a position such that the floats are off-set from one-another with regard to a changed direction from which the waves are moving. In this regard, it has been found experimentally that the magnitude of turbulence such as wave rings, for example, is decreased to a substantial and major and significant degree when the floats of a plurality are not off-set from and relative to one-another, with regard to the direction of movement of the waves of the sea — referring to regular waves such as wind waves for example.

Finally, it should be noted that the size of the float, the total mass of the float and all associated structure, including the shaft on which it is mounted, and the nature of the waves of the sea or ocean or other body of water, together with the substantially exact spacing of the floats from one-another at predetermined distances, as well as preferably avoiding free-channel space extending lineally between floats along a line parallel to the direction of movement of the wave(s) of the sea (or the like) by having the off-set floats preferably over-lapping one-another athough off-set from one-another, all contribute to maximizing total energy operative in the mechanism of the present invention, with the result of amplified strokes of the reciprocating shafts of the plurality of floats.

The mounting platform for a plurality of floats may be individual and separate float platforms for each one or more floats, but preferably a large number of the off-set floats are mounted on a common platform with appropriate support legs. Accordingly, the float platform illustrated in the following FIG. 2 is merely diagrammatic of support structure for either one or preferably a plurality of floats commonly from the same platform.

In like manner, for the illustrated underwater barrier(s) of the present invention, such barriers are not essential to the present invention and are illustrated solely from the standpoint that it is known that such barriers do alter and/or effect and/or cause turbulence to some degree or another, and it is within the spirit and scope of the present invention that such turbulences and/or altered undersea current(s) may be utilized with the present invention in so far as phase(s) of undulating water pressure(s) and/or wave(s) and/or direction(s) of flow thereof beneficially contribute to the improved and amplified reciprocating strokes of the floats of the plurality of floats off-set as defined in the preceding disclosure. Accordingly, the illustrated position(s) of barrier(s), which may be of permanent angle of deflection or alternately may be variable manually or automatically, in the specific positions illustrated are not in any sense intended to represent the best or preferred locations of such barriers nor the distance from the floats, since such locations and distances will vary considerably from situation to situation, as dependent on matters previously typically related earlier in this paragraph as current direction and magnitude and depth of water and size and arrangement of floats, and the like. Accordingly, the size and location of barriers as well as the size and exact distances illustrated between spaced-apart floats as illustrated in the accompanying figures, are all intended solely to be diagrammatic and not specific nor controlling.

The maximizing of the strokes in accord with the present invention, beyond the extent to which the controlling limitations are set forth, are mere matters of conventional engineering and some degree of experimentation hereafter.

The invention may be better understood by making reference to the following diagrammatic Figures, illustrating the spirit of the invention.

THE FIGURES

FIG. 1 illustrates a diagrammatically in elevation plan view, a plurality of floats arranged typically in accord with a preferred embodiment of the invention, together with a water body, and together with interconnecting power-transmitting mechanisms and power converters and the like.

Figure 1:
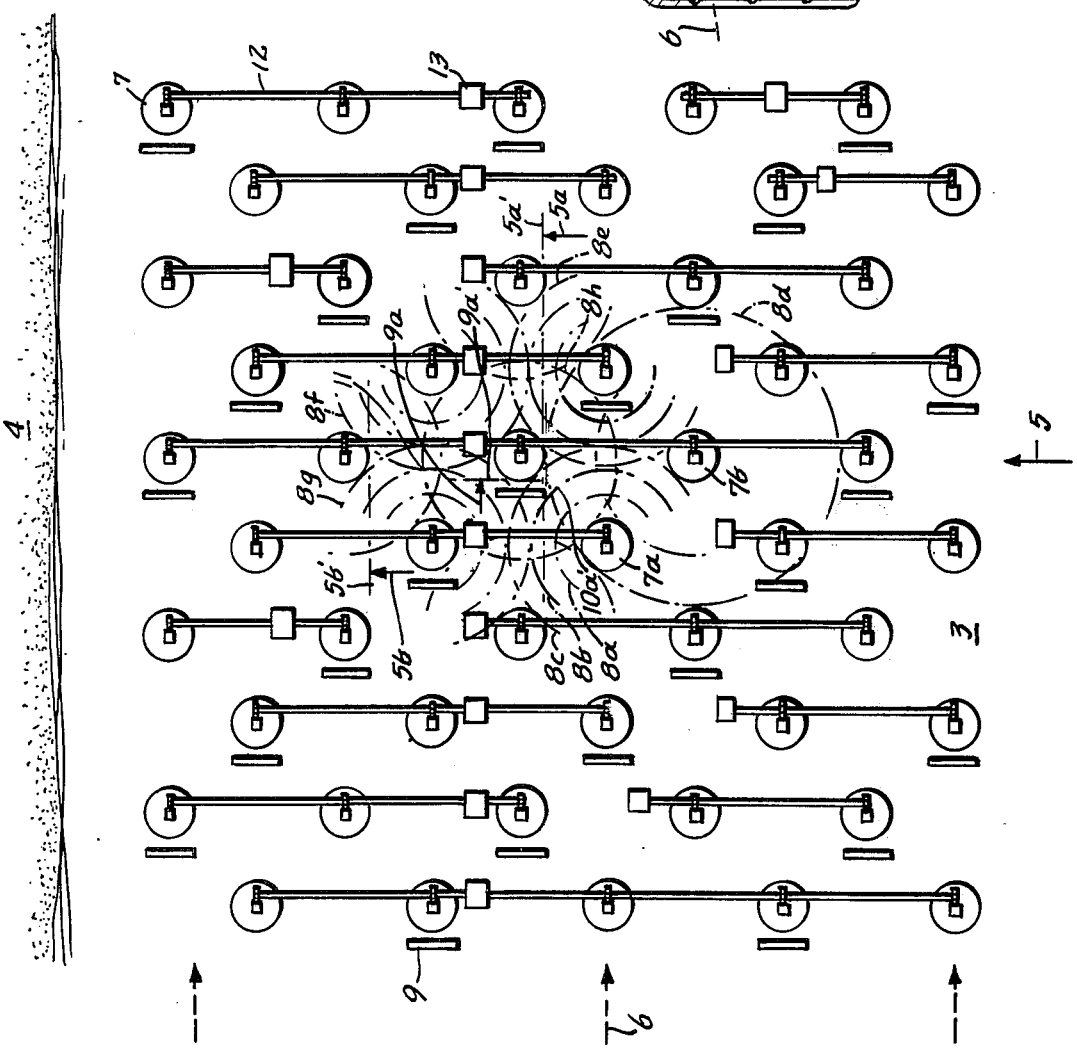
Figure 3:
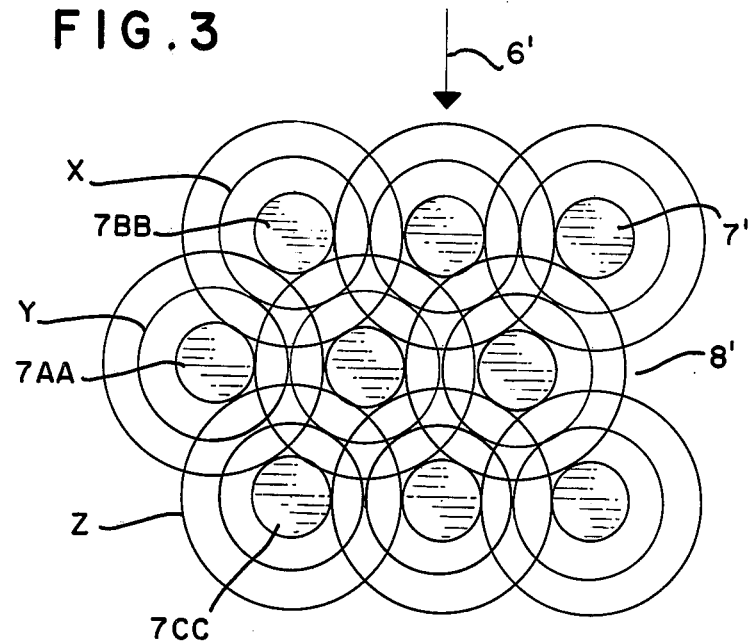

FIG. 3 illustrates another diagrammatic elevation plan view analagous to that of FIG. 1, except better illustrating a preferred relative relationship of size of floats to one-another with regard to the degree of offsetting of the plurality thereof one relative to others preceding and/or following along a direction of movement of waves such as typically sea or ocean waves, for example, and better illustrating, in an enlarged view, the wave rings moving outwardly from the various ones of the floats.

Figure 4:
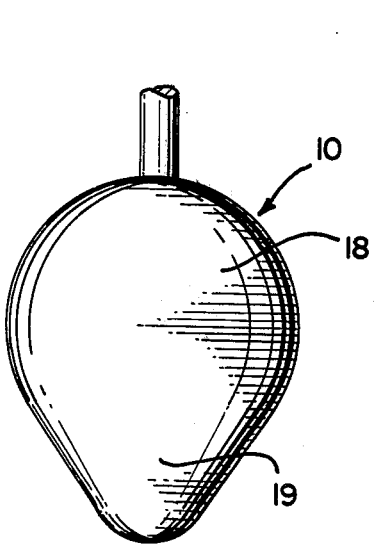
Figure 5:
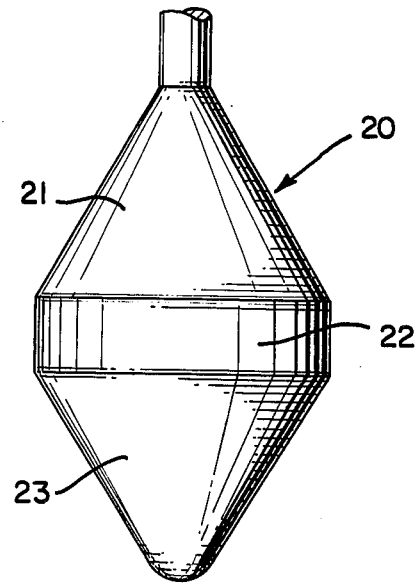

Each of FIGS. 4 and 5 illustrate alternate embodiments of more preferred float shapes for employment with the present invention, particularly the float of FIG. 4, shown each in elevation side view as suspended from an upright reciprocatable shaft each shaft shown in and in-part view.

DETAILED DESCRIPTION OF THE INVENTION

Figure 2:
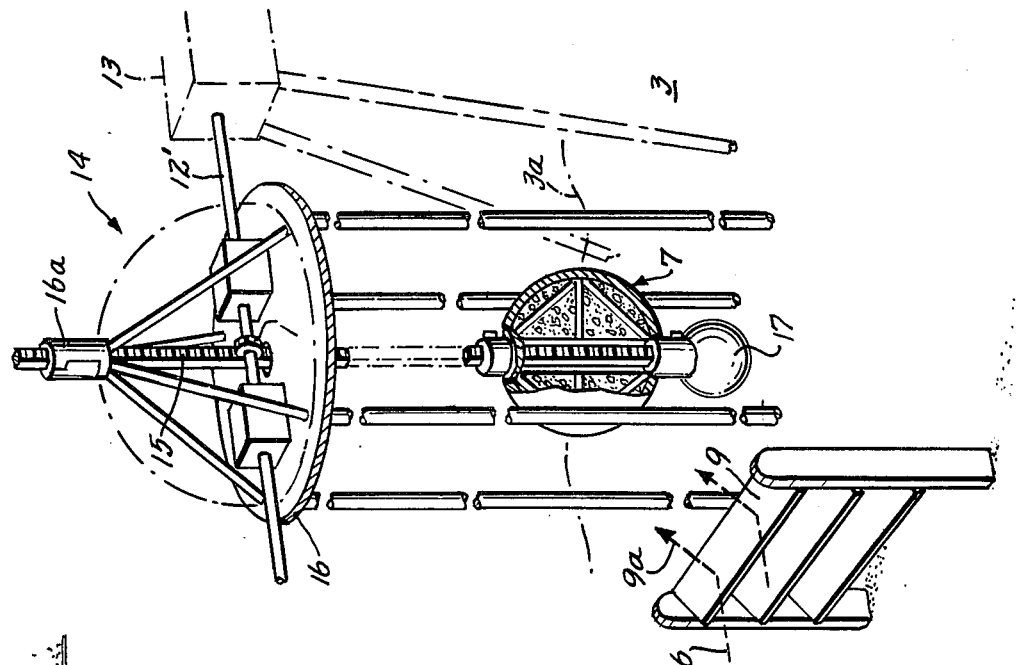
FIG. 2 illustrates diagrammatically, in in-part view, and with the power converter(s) shown in phantom, a typical appearance in side perspective view of one of the float structure combinations of FIG. 1.

For a large body of water 3 such as near a shore 4, but not necessarily near a shore, representatively waves are travelling in direction 5, and representatively current(s) are traveling in direction 6 which currents are typically deflected by deflector(s) 9 in direction 9a to thereby increase water pressure in these directions as best shown in FIG. 2 but also designated in the FIG. 1. Accordingly, the various floats 7 are responsive to these waves, currents, and water pressures. Additionally, however, as is typically represented for float 7a, as the float rises and falls with the waves and/or responsive to other water pressures, additional water turbulences are produced such as typically the radially outwardly moving concentric wave rings 8a, 8b, 8c and the like. In like manner, float 7b is represented as having produced the wave ring 8d which for example extends to an outer edge (as represented) of the central-most float of the plurality, as would also the wave rings of other equally distant floats from that central-most float, for example. As, for example, the wave ring 8d touches the central-most float, also the wave 5a' moving in direction 5a combines its pressure and influence therewith. Analagous to the wave ring 8c of float 7a, for other floats spaced-around the central-most float, there are wave rings 8e, 8f, and 8g. It is possible at intermittent times for two or more of the wave rings 8c, 8d, 8e, 8f, 8g and wave 5a' and increased water pressure from deflected current 9a to concurrently exert their effects against the central-most float (as well as against other floats). Concurrently and/or intermittently also additional water turbulences and resulting deflected water pressures occur as for example wave ring 8h (of the central-most float) intersects wave rings 8f and 8g as for example at point 11, and/or when any two or more wave rings intersect with each other or meet another float concurrently as is illustrated where wave rings 8f and 8g concurrent with wave 5b' (moving in direction 5b) all exert simultaneously their effects on a single float.

The result of these reflected and additional water turbulences as set forth typically above, is repeated use of residual energy of prior waves, currents, deflections, and the like, as well as continuing to add to this newly-occuring energy releases from new waves and/or currents. The overall effect is a much greater stroke length than could possibly be foreseen or otherwise possible from single-float independent isolated floats, for example, and an increased power potential making wave energy a practical competitive reality for the first time.

With reference to FIG. 3, shown in an in-part diagrammatic elevation plan view of floats 7' position with respective rows $x$, $y$, and $z$ positioned substantially perpendicularly to the direction 6' of wave(s) movement(s), with the individual floats 7aa of row $y$ off-set from each of the floats 7bb of row $x$ and 7cc of row $z$, each of the floats 7' individually producing wave rings 8'.

FIG. 4 illustrates a preferred float 10 having a hemispherical upper portion 17 and a conical lower portion 19. Alternate embodiment FIG. 5 float 20 illustrates a conical top, a cylindrical mid-section which aids in gaining a predictable amplitude of wave-ring and stroke, and the lower conically-shaped bottom.

Symbolically and merely diagrammatically, the Figures also illustrate typically a driven gear 12 and interconnecting shafts 12 driving power conversion mechanisms 13 — typically including generators, etc., for example, and merely diagrammatically representative of such by a box shape, for an upwardly and downwardly reciprocatable float combination 14 with its rack 15 and its predetermined extra mass element 17, and support structure 16, and typical bearing guide structures 16a and 16b. Wave water level relative to the FIG. 2 float 7 is illustrated by phantom line 3a.

It is within the scope and spirit of the present invention to make such variations and modifications and substitution of equivalents as would be apparent to a person of ordinarly skill.

I claim:

1. A wave energy device comprising in combination: a plurality of floats in water, spaced apart from one-another predetermined distances and positioned in substantially off-set positions from one-another in substantially non-lineal alignment relative to a predetermined direction of wave movement by virtue of said predetermined distances and said positioned state such that different ones of the plurality are intercepted by substantially common waves at different points in time, said predetermined distances being within a range of dimensions sufficiently small and sufficiently great such that floats' substantially concentric waves of turbulence moving substantially radially outwardly from each of the plurality coincide with one-another of others of the plurality at the floats whereby amplified reciprocating upward and downward motions occur to the floats at coinciding waves, at least one of said floats including leverage means for transmitting reciprocating motion of the one of the plurality.

2. A wave energy device of claim 1, in which the lever means interconnects said plurality such that reciprocating motions thereof are commonly transmitted.

3. A wave energy device of claim 2, including deflector structure positioned at a predetermined location relative to at least one of said plurality such that deflected water and pressure thereof is cumulative with pressure of other waves and current to impart amplified reciprocating stroke lengths to reciprocating motions of the lever means.

4. A wave energy device of claim 1, including deflector structure positioned at a predetermined location relative to at least one of said plurality whereby reciprocating upward and downward motions of at least one of the plurality are amplified when said plurality and said deflector structure are subjected to forces of moving water.

5. A wave energy device of claim 1, including as said floats, a first float having a conical bottom portion.

6. A wave energy device of claim 5, in which said first float includes a substantially hemispherical upper portion continuous with said conical bottom portion.

7. A wave energy device of claim 1, including as said float, a first float having a conical top portion.

8. A process for harnessing energy comprising in combination: placing a plurality of floats in a body of water, in an off-set pattern of substantially non-lineal alignment with open-spacings between one-another thereof; firstly-subjecting the plurality to a first of a substantially rearwardly-moving water wave-force in said body of water, causing thereby reciprocating upward and downward movement thereof producing thereby a second water wave-force moving outwardly from at least one of the plurality; secondly-subjecting a first one of the plurality to said second waveforce; and coincident with said second water wave-force, thirdly-subjecting at least one of the plurality to a second one of said substantially rearwardly-moving water wave-force; and during said firstly, secondly, and thirdly-subjectings, maintaining said open-spacings at predetermined distances of the floats from one-another within a range of dimensions sufficiently small and sufficiently great such that said secondly and thirdly-subjecting cumulatively amplify upright reciprocation of said at least one.

9. A process for harnessing energy, of claim 8 including combining driving torques of said plurality obtained from said upward and downward reciprocation responsive to both of said firstly subjecting and said secondly subjecting.

* * * * *